(12) United States Patent
Billiot

(10) Patent No.: US 8,770,767 B2
(45) Date of Patent: Jul. 8, 2014

(54) SLIDING MIRROR SYSTEM

(76) Inventor: Edwine A. Billiot, Bayou Vista, LA (US)

( * ) Notice: Subject to any disclaimer, the term of this patent is extended or adjusted under 35 U.S.C. 154(b) by 122 days.

(21) Appl. No.: 13/546,865

(22) Filed: Jul. 11, 2012

(65) Prior Publication Data

US 2013/0016438 A1    Jan. 17, 2013

Related U.S. Application Data

(60) Provisional application No. 61/507,915, filed on Jul. 14, 2011.

(51) Int. Cl.
  *G02B 5/10*   (2006.01)
  *G02B 7/182*   (2006.01)
  *G02B 7/183*   (2006.01)

(52) U.S. Cl.
  CPC   *G02B 7/182* (2013.01); *G02B 5/10* (2013.01); *G02B 7/183* (2013.01)
  USPC   359/851; 359/853; 359/854; 359/855; 359/865; 359/881

(58) Field of Classification Search
  CPC .................. G02B 5/10; G02B 7/182
  USPC ......... 359/850, 851, 853–858, 862, 863, 865, 359/869, 872, 879, 881
  See application file for complete search history.

(56) References Cited

U.S. PATENT DOCUMENTS

| | | | | |
|---|---|---|---|---|
| 381,452 | A * | 4/1888 | Wiederer | 355/854 |
| 569,503 | A * | 10/1896 | Keyes | 359/851 |
| 656,927 | A * | 8/1900 | Biver et al. | 472/63 |
| 1,794,142 | A * | 2/1931 | Boston | 396/376 |
| 2,077,104 | A * | 4/1937 | Lewis | 352/88 |
| 2,273,604 | A * | 2/1942 | Vetter | 40/473 |
| 2,489,506 | A * | 11/1949 | Seutin | 359/854 |
| 2,586,583 | A * | 2/1952 | Wagner | 362/346 |
| 4,268,121 | A * | 5/1981 | Peskin | 359/856 |
| 4,775,231 | A * | 10/1988 | Granzow et al. | 359/860 |
| 4,882,795 | A | 11/1989 | Baus | |
| 5,047,908 | A * | 9/1991 | Dixon et al. | 362/346 |
| 5,124,847 | A | 6/1992 | Gong | |
| 1,422,685 | A * | 7/1992 | Lee | 359/854 |
| 2004/0090688 | A1* | 5/2004 | Mostrom | 359/850 |

* cited by examiner

*Primary Examiner* — Ricky D Shafer
(74) *Attorney, Agent, or Firm* — Richard C Litman

(57) ABSTRACT

The sliding mirror system permits a 360° view of an object or subject to be viewed. The system includes a plurality of panels, at least one panel being movable relative to the other panels. The movable panel(s) is mounted on rails or the like for sliding movement. Each panel is configured as a portion of an arc. Multiple mirrors are mounted on the face of each panel. Each mirror may also assume an arc-shaped configuration.

13 Claims, 5 Drawing Sheets

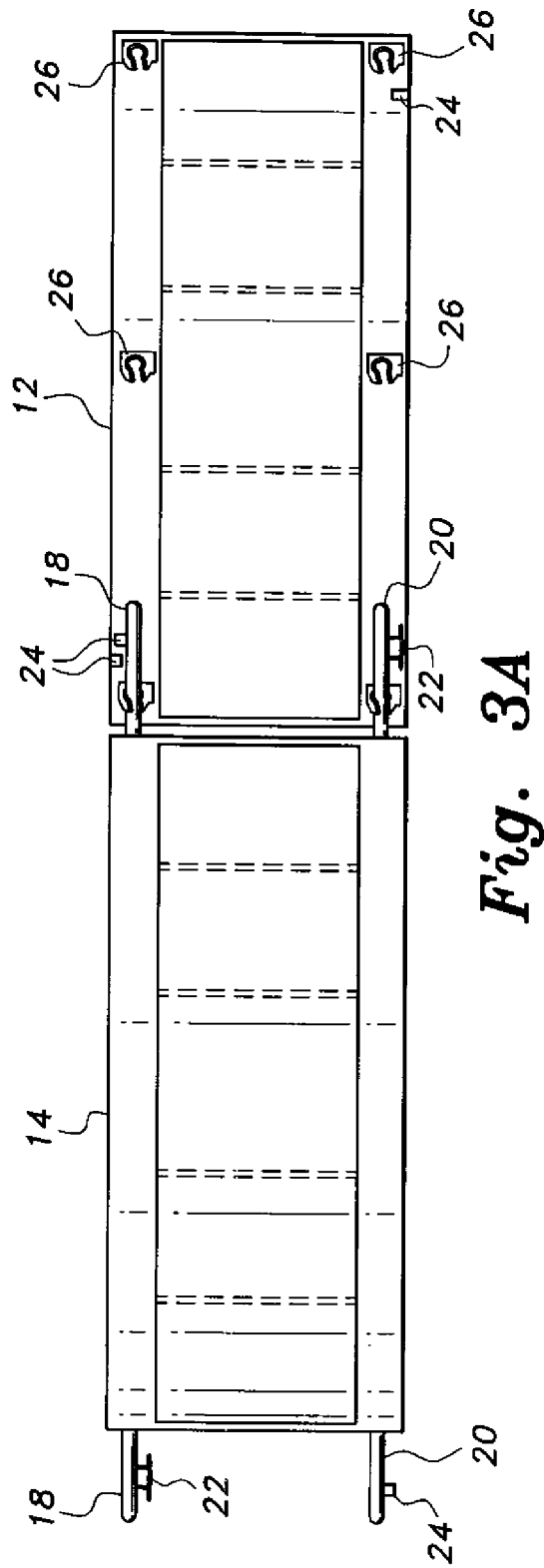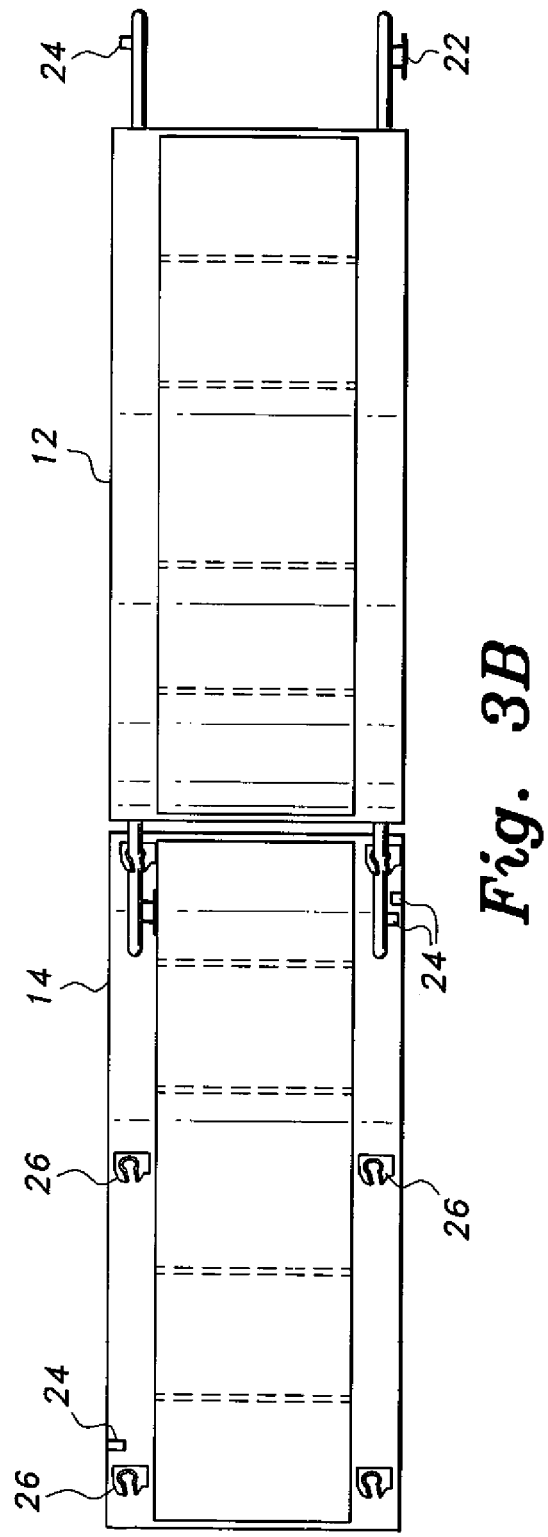

SLIDING MIRROR SYSTEM

CROSS-REFERENCE TO RELATED APPLICATION

This application claims the benefit of U.S. Provisional Patent Application Ser. No. 61/507,915, filed Jul. 14, 2011.

BACKGROUND OF THE INVENTION

1. Field of the Invention

The present invention generally relates to reflective panels, and particularly to a sliding mirror system having panels that provide a 360° panoramic view of a subject.

2. Description of the Related Art

Heretofore, viewing an object, e.g., oneself, in a single, planar mirror has been restricted because the single mirror would only present a reflection of the surface (front, side, rear, top or bottom) of the object exposed to the mirror. To see another view of oneself or another surface of an object required awkwardly twisting one's neck to look over the shoulder to see one's back, reorientation of the object or reorientation of the mirror surface. Alternatively, several mirrors could be individually positioned to obtain the desired views. The above-described scenarios are cumbersome, time-consuming and inefficient. The art would welcome a mirror system that would permit efficient viewing of a stationary object from 360° without tiresome mirror manipulation or contorting one's body to obtain the desired perspective. Thus, a sliding mirror system solving the aforementioned problems is desired.

SUMMARY OF THE INVENTION

The sliding mirror system permits a 360° view of an object or subject to be viewed. The system includes a plurality of panels, at least one of the panels being movable. The movable panel(s) is mounted on rails or the like for sliding movement. Each panel is configured as a portion of an arc. One or more mirrors are mounted on the face of each panel. Each mirror may be flat or may also assume an arc-shaped configuration. Although plural panels are preferred, it is recognized that only one arc-shaped movable panel having one or more flat or arc-shaped mirrors may be employed if desired.

Accordingly, the invention presents a sliding mirror system that permits 360° viewing. The uses of the instant system are many. For example, the system would be favorably welcome in high-end fashion stores, bridal boutiques and the like. The system would also find use in beauty salons, spas, barbershops, solar systems, etc. The system is readily adaptable to any environment that employs mirrors for reflective viewing. The system may be designed in a stand-alone or wall-mounted configuration, and may range in size from that of an over-the-bathroom-vanity size to full-length mirror size. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

FIGS. 3A and 3B are rear views of a pair of panels in a sliding mirror system according to the present invention, showing details of interconnecting the panels.

Similar reference characters denote corresponding features consistently throughout the attached drawings.

DETAILED DESCRIPTION OF THE PREFERRED EMBODIMENTS

Figure 1:
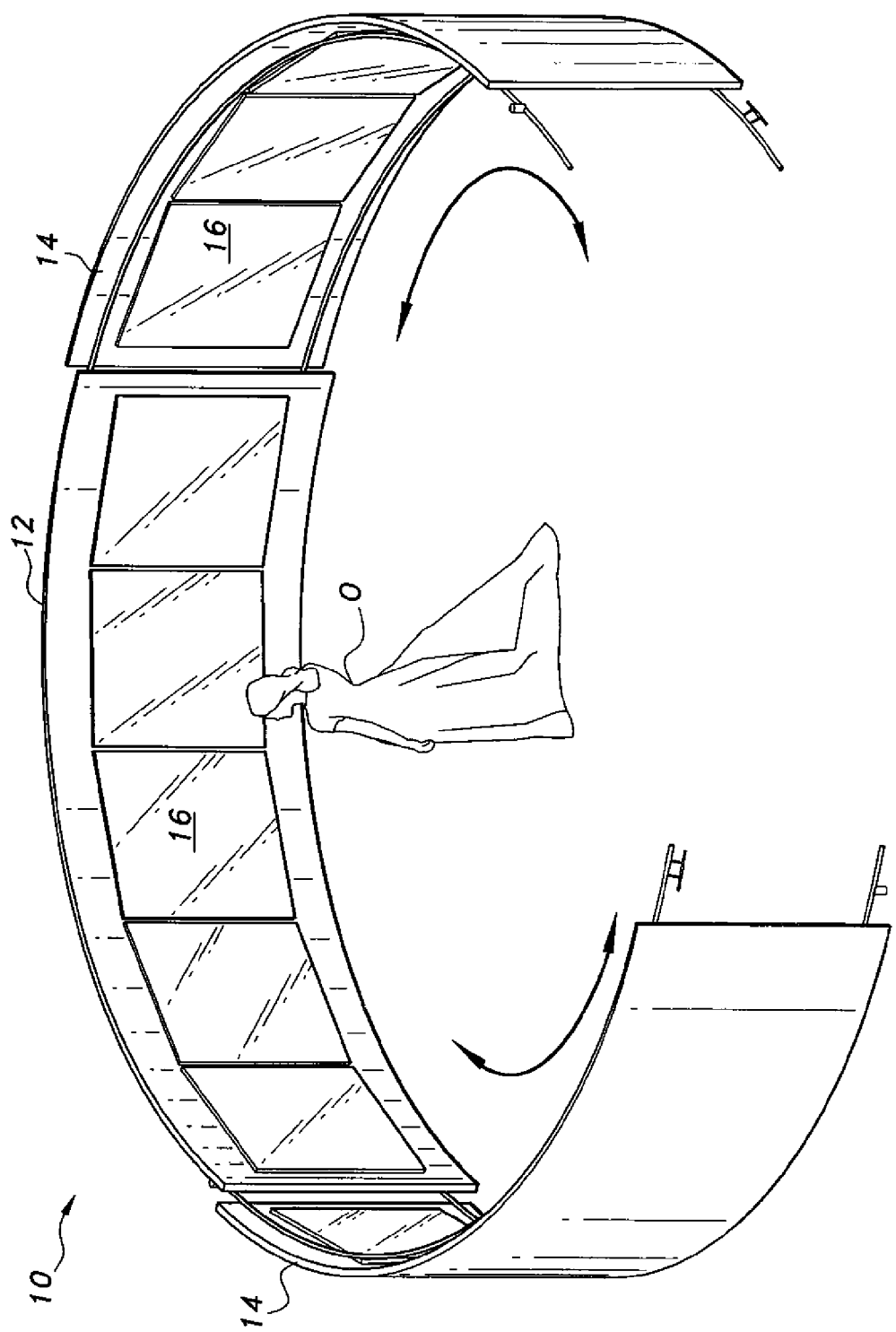
FIG. 1 is an environmental, perspective view of a sliding mirror system according to the present invention.
Figure 2:
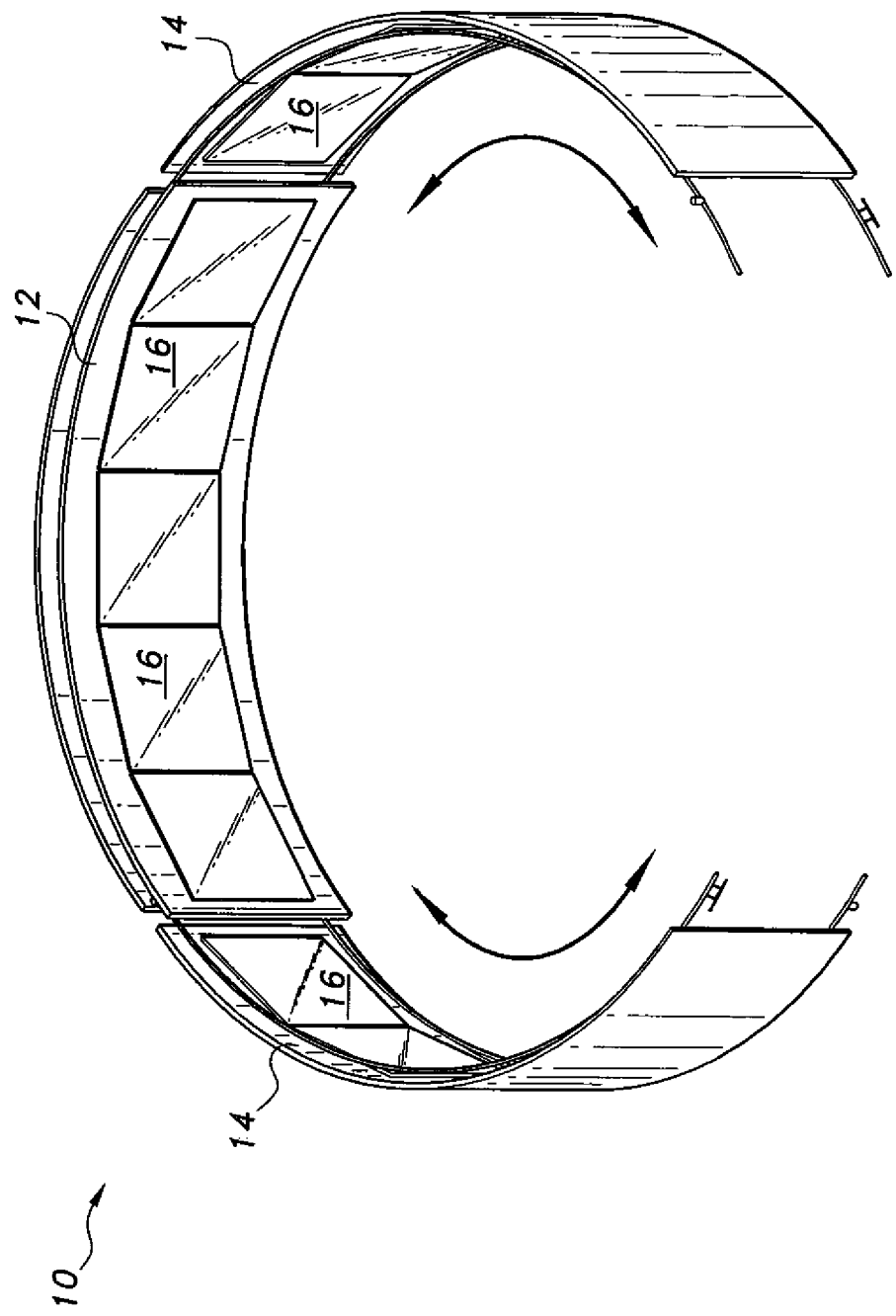
FIG. 2 is a perspective view of a sliding mirror system according to the present invention.
Figure 4A:
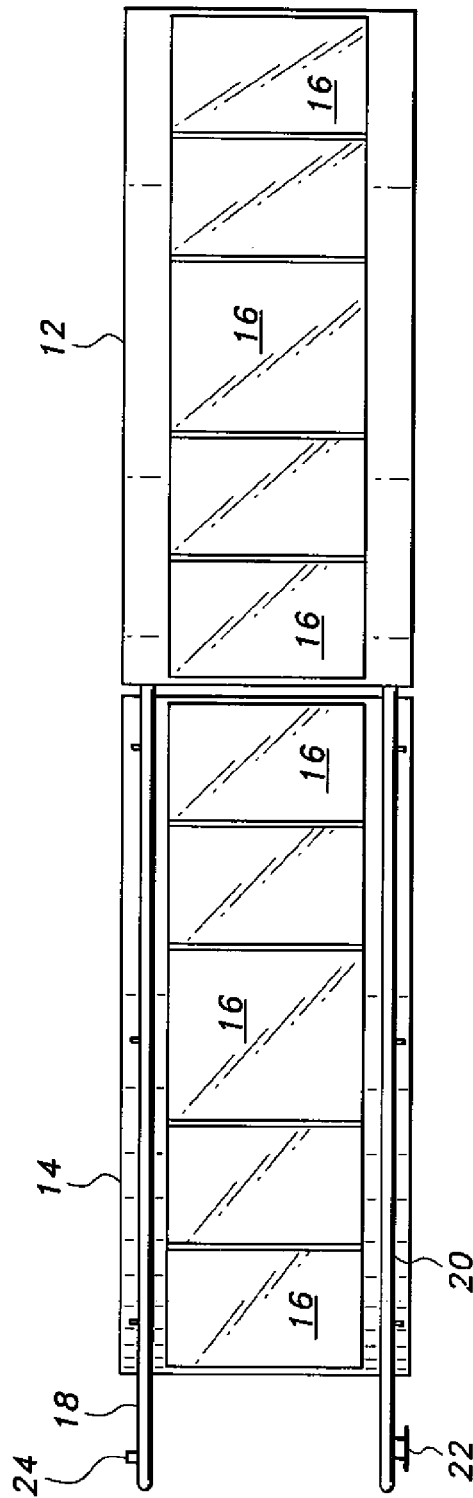
FIGS. 4A and 4B are front views of a pair of panels in a sliding mirror system according to the present invention.
Figure 4B:
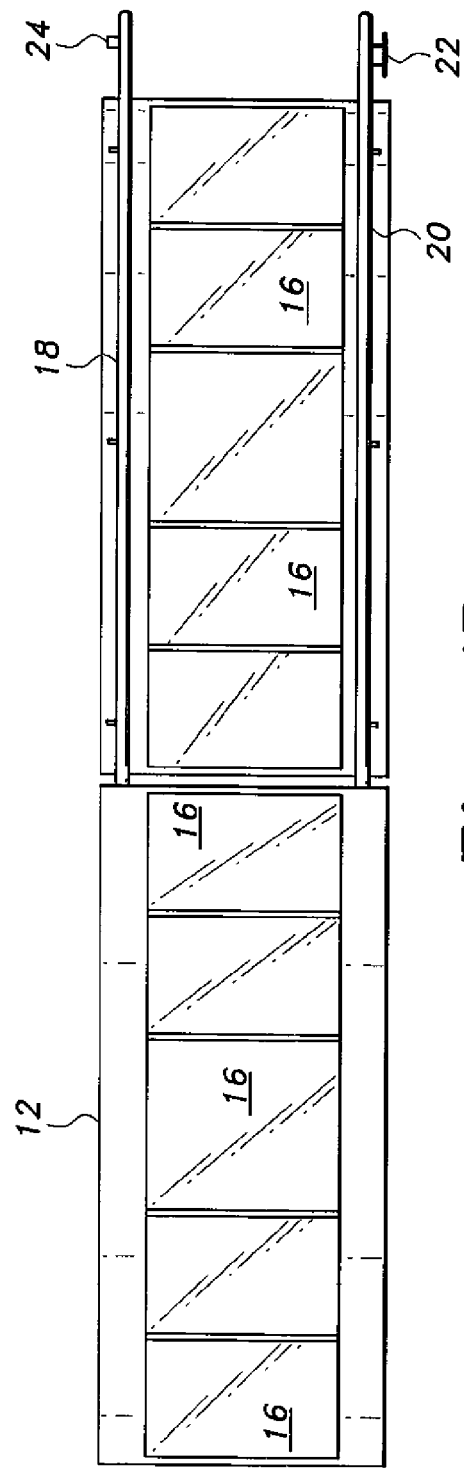
Figure 5A:
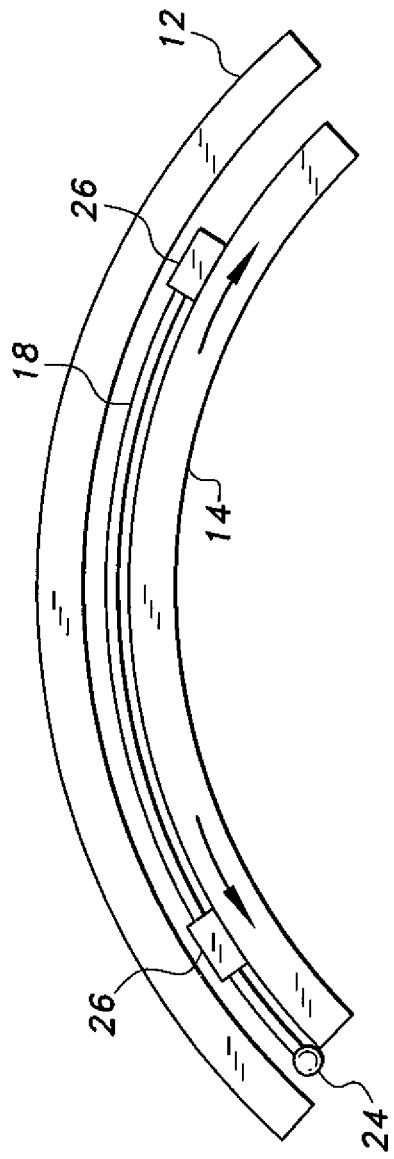
FIG. 5A is a partial top view of a sliding mirror system according to the present invention.
Figure 5B:
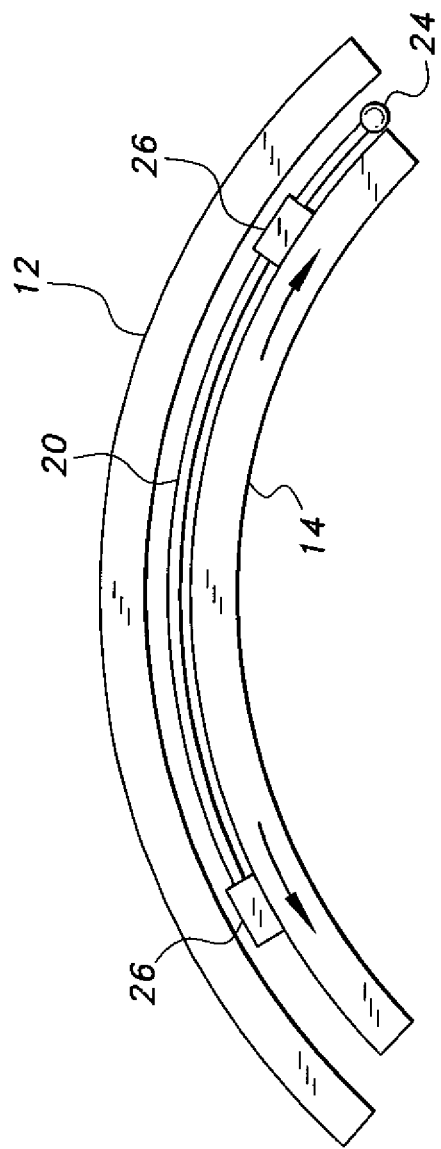
FIG. 5B is a partial bottom view of a sliding mirror system according to the present invention.

Referring to FIGS. 1 and 2, the sliding mirror system 10 comprises a front panel 12 configured as a portion of an arc. One or more movable panels 14 are mounted for sliding movement relative to the front panel 12. Front panel 12 may also be movable if desired. Each sliding panel 14 is also configured as a portion of an arc. One or more mirrors 16 are mounted on the front surfaces of the panels 12 and 14. Each mirror 16 may be flat or also assume an arc-shaped configuration. The mirrors 16 are mounted to the front surface of the panels 12, 14 in any suitable manner (glue, plastic fasteners, hook and loop fasteners, etc.). The sliding panels 14 may be nested behind the front panel 12 or extended, as shown, to allow 360° viewing of an object O.

As best seen in FIGS. 3A-5B, upper and lower arc-shaped rails 18, 20 are attached to the front surface of the sliding panel(s) 14. The rails 18, 20 nay be attached in any suitable manner. The rails 18, 20 are slidable in bearings 26 that are attached to the rear surface of the panel 12. The bearings 26 are conventional, and are attached to the panel 12 in any suitable manner. Stops 24 are positioned on the panels 12, 14 and on opposite ends of rails 18, 20 to prevent the panels 12, 14 from becoming disengaged when extended. Handles 22 are mounted at opposite ends of the rails 18, 20 to facilitate sliding thereof. In lieu of handles 22, a motorized mechanism (not shown) may be used to extend and retract the panels 14. Also a rail channel and decorative cover may be employed to enhance stability and aesthetics. An embodiment of the invention is also contemplated that would require only a stationary panel having pivoted mirrors attached thereto.

It is to be understood that the present invention is not limited to the embodiments described above, but encompasses any and all embodiments within the scope of the following claims.

I claim:

1. A sliding mirror system, comprising:
   a first arc-shaped panel having a front surface and a rear surface;
   a second arc-shaped panel having a front surface and a rear surface, the second arc-shaped panel being slidably mounted to the first arc-shaped panel;
   a first plurality of mirrors mounted to the front surface of the first arc-shaped panel;
   upper and lower rails attached to the front surface of the second arc-shaped panel; and
   a second plurality of mirrors mounted to the front surface of the second arc-shaped panel.

2. The sliding mirror system according to claim 1 wherein the upper and lower rails are arc-shaped.

3. The sliding mirror system according to claim 1, further including upper and lower bearing members mounted on the rear surface of the first arc-shaped panel.

4. The sliding mirror system according to claim 1, wherein the first plurality of mirrors and the second plurality of mirrors are arc-shaped.

5. A sliding mirror system, comprising:
   a first arc-shaped panel having a front surface and a rear surface;
   a second arc-shaped panel having a front surface and a rear surface, the second arc-shaped panel being slidably mounted to the first arc-shaped panel;
   a first plurality of mirrors mounted to the front surface of the first arc-shaped panel; a second plurality of mirrors mounted to the front surface of the second arc-shaped panel;
   an upper rail attached to the front surface of the second arc-shaped panel, the upper rail having a first end and a second end; and a lower rail attached to the front surface of the second arc-shaped panel, the lower rail having a first end and a second end.

6. The sliding mirror system according to claim 5, further including a first handle mounted on the first end of the upper rail and a second handle mounted on the second end of the lower rail.

7. The sliding mirror system according to claim 5, further including:
   a first stop member mounted on the second end of the upper rail;
   a second stop member mounted on the first end of the lower rail; and
   a plurality of stop members positioned on said the first panel and the second panel for engaging the first stop member and the second stop member to prevent disengagement of the first panel from the second panel.

8. The sliding mirror system according to claim 5, further including upper and lower bearing members mounted on the rear surface of the first arc-shaped panel, the upper rail and the lower rail being slidably disposed in the upper and lower bearing members, respectively.

9. The sliding mirror system according to claim 5, wherein the mirrors are arc-shaped.

10. A sliding mirror system, comprising:
    a first arc-shaped panel having a front surface and a rear surface;
    a second arc-shaped panel having a front surface and a rear surface, the second arc-shaped panel being slidably mounted to the first arc-shaped panel;
    a first plurality of arc-shaped mirrors mounted to the front surface of the first arc-shaped panel;
    a second plurality of arc-shaped mirrors mounted to the front surface of the second arc-shaped panel;
    an arc-shaped upper rail attached to the front surface of the second arc-shaped panel, the upper rail having a first end and a second end; and
    an arc-shaped lower rail attached to the front surface of the second arc-shaped panel, the lower rail having a first end and a second end.

11. The sliding mirror system according to claim 10, further including a first handle mounted on the first end of the upper rail and a second handle mounted on the second end of the lower rail.

12. The sliding mirror system according to claim 10, further including:
    a first stop member mounted on the second end of the upper rail;
    a second stop member mounted on the first end of the lower rail; and
    a plurality of stop members positioned on the first panel and the second panel for engaging the first stop member and the second stop member to prevent disengagement of the first panel from the second panel.

13. The sliding mirror system according to claim 10, further including upper and lower bearing members mounted on the rear surface of the first arc-shaped panel, the upper rail and the lower rail being slidably disposed in the upper and lower bearing members, respectively.

* * * * *